(12) United States Patent
Gardner et al.

(10) Patent No.: US 6,235,036 B1
(45) Date of Patent: May 22, 2001

(54) EAR TAG APPLICATOR (76) Inventors: Michael Stuart Gardner, 108 Walatarua Road, Remuera, Auckland; Roy Victor Bladen, 292 Glenmore Road, RD 3, Albany, both of (NZ)

( * ) Notice: Subject to any disclaimer, the term of this patent is extended or adjusted under 35 U.S.C. 154(b) by 0 days.

(21) Appl. No.: 09/308,153
(22) PCT Filed: Nov. 13, 1997
(86) PCT No.: PCT/NZ97/00155
§ 371 Date: May 14, 1999
§ 102(e) Date: May 14, 1999
(87) PCT Pub. No.: WO98/22028
PCT Pub. Date: May 28, 1998

(30) Foreign Application Priority Data

Nov. 15, 1996 (NZ) .................................................. 299763
Aug. 29, 1997 (NZ) .................................................. 328643

(51) Int. Cl.[7] .............................. A61B 17/00; A61D 1/04
(52) U.S. Cl. .......................................................... 606/117
(58) Field of Search ................................. 606/117, 188, 606/118; 40/300, 301, 302

(56) References Cited

U.S. PATENT DOCUMENTS

| | | |
|---|---|---|
| 3,812,859 | * 5/1974 | Murphy et al. ..................... 606/117 |
| 4,120,303 | 10/1978 | Villa-Massone et al. . |
| 4,368,735 | 1/1983 | Filmer . |
| 4,531,520 | * 7/1985 | Reggers et al. ..................... 606/117 |
| 4,672,966 | 6/1987 | Hass, Jr. . |
| 4,716,899 | * 1/1988 | Huenefeld et al. .................. 606/117 |
| 5,154,721 | * 10/1992 | Perez ................................... 606/117 |
| 5,462,554 | 10/1995 | Gardner . |

FOREIGN PATENT DOCUMENTS

2840268 * 3/1980 (DE) .................................... 606/117

* cited by examiner

Primary Examiner—Todd E. Manahan
Assistant Examiner—Eduardo C. Robert
(74) Attorney, Agent, or Firm—Bracewell & Patterson LLP; Frank S. Vaden, III (57) ABSTRACT

An animal ear tag applicator has first and second jaws moveable radially towards each other by a pair of pivotally connected handles. The jaws are biased to an open position and the first jaw with its male tag engaging pin is forced to move to an open position independently of the handles once the male ear tag has fully engaged with the animal's ear. The pin is angled forwardly so that with the radial movement of the first jaw the pin is at substantially 90° as the animal's ear is engaged and the pin is able to move beyond the 90° position before the first jaw opens. In one embodiment, the pin is pivoted on the first jaw to reduce the likelihood of the male and female tags jamming in the applicator.

6 Claims, 11 Drawing Sheets

EAR TAG APPLICATOR

This application is filed under 35 U.S.C. §371 as a national stage application of PCT/NZ97/00155, "Ear Tag Applicator", filed Nov. 13, 1997, now pending.

BACKGROUND OF THE INVENTION

This invention relates to an ear tag applicator for the application of ear tags to animals such as cattle and the like for identification.

A number of ear tag applicators are already well-known in the art and disclosed in various patent specifications. When considering those that relate to applicators for the placement of two-piece ear tags, a variety of methods have been sought for releasing the ear tag once applied. The simplest versions are plier type applicators in which the handles are biased away from each other so that the jaws pivot to an open position as the handles similarly pivot away from each other to release the ear tag. If the animal should move while this is taking place, damage can be caused to the animal's ear. With the handles requiring manual closing, the biasing means cannot open the jaws of the applicator until the user releases pressure on the handles and this creates some delay.

To overcome this problem, various applicators for two-piece ear tags have provided pins engaging the male portion of the tag which can release from the male tag. Such mechanisms are not always reliable and there is a tendency for the pin to become locked into engagement with the male tag once it has engaged with the female tag when the animal pulls away jamming the jaws of the applicator.

The present invention will be particularly described with respect to two piece ear tags which will be referred to as comprising a male and a female tag for simplicity, although these together form part of a single tag. However, it is to be appreciated that the present invention could be readily used with a single piece ear tag where the animal's ear provides the resistance to the tag pulling out.

OBJECT OF THE INVENTION

Therefore, it is an object of the present invention to provide an animal ear tag applicator which will overcome some of the disadvantages of the prior art or at least provide the public with a useful choice.

STATEMENTS OF INVENTION

Accordingly, in a first aspect, the invention may broadly be said to consist in an animal ear tag applicator comprising:
 a first jaw portion to engage a portion of an animal ear tag;
 a second jaw portion;
 first and second handle portions to move said first and second jaw portions such that movement of said first handle portion with respect to said second handle portion drives the first and second jaw portions towards each other to engage said portion of said ear tag with an animal's ear;
 biasing means to bias said jaw portions to an open position; and
 wherein said first jaw portions can move under the action of the biasing means to an open position independently of said handle portions but only after the portion of the ear tag has fully engaged with the animal's ear.

Preferably said first jaw portion is provided with an elongate engagement means to engage within a cavity of said portion of said ear tag.

Preferably said elongate engagement means is adapted to move outwardly from said first jaw portion in response to a force transverse to said elongate engagement means.

Preferably said elongate engagement means is pivotally connected to said first jaw portion or has some flexibility to allow at least partial rotation of said elongate engagement means outwardly from said applicator.

Preferably said first jaw portion is disconnected from corresponding motion with said handle portions only after said portion of the ear tag has fully engaged with the animal's ear such that said first jaw portion may rotate about a common pivot axis to said open position independently of said handle portions.

Further aspects of this invention may become apparent to those skilled in the art upon reading the following description.

BRIEF DESCRIPTION OF THE DRAWINGS

The description will now be provided with reference to the drawings in which.

DETAILED DESCRIPTION OF PREFERRED EMBODIMENTS

Figure 1:
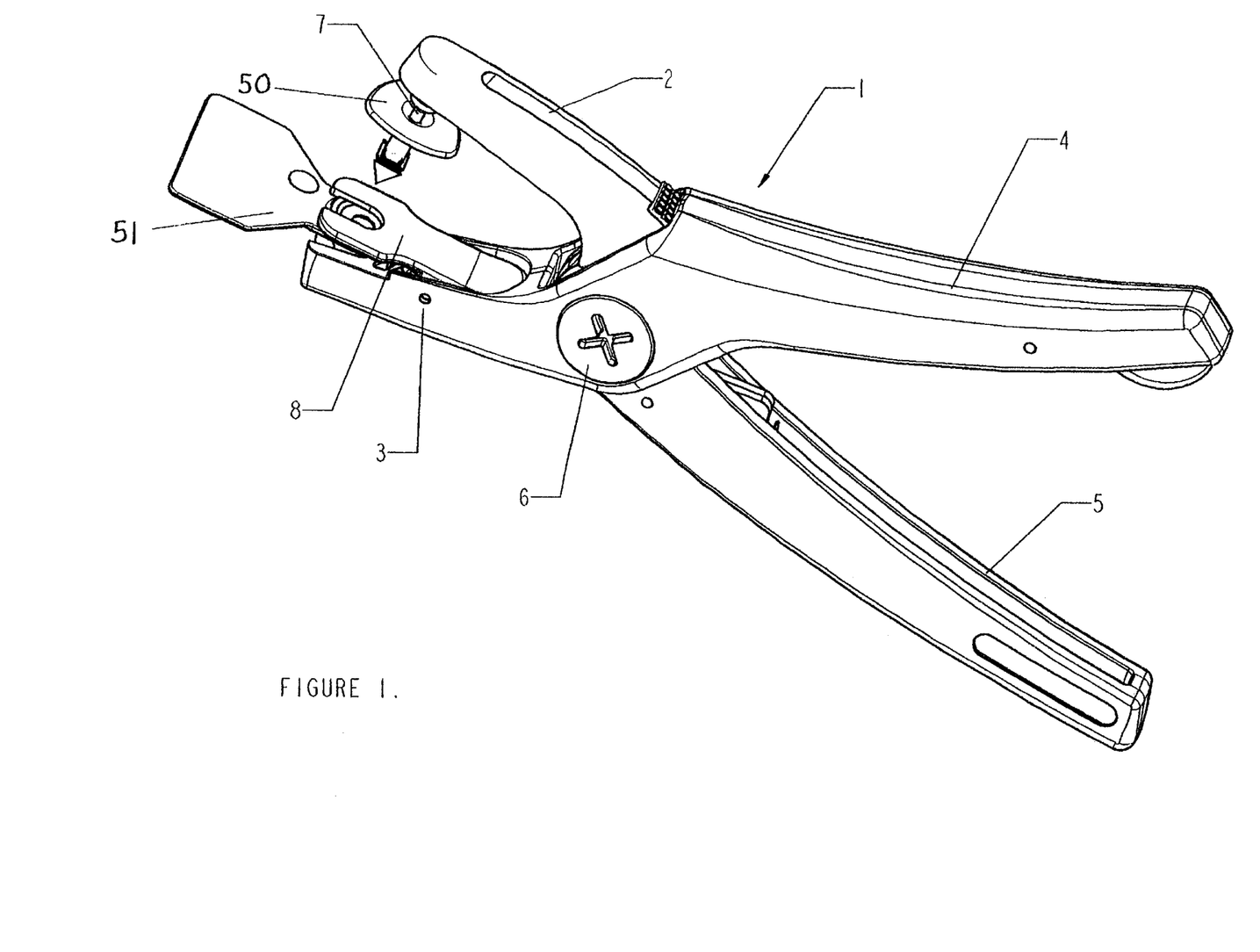
FIG. 1: shows a perspective view of one embodiment of the applicator.
Figure 2:
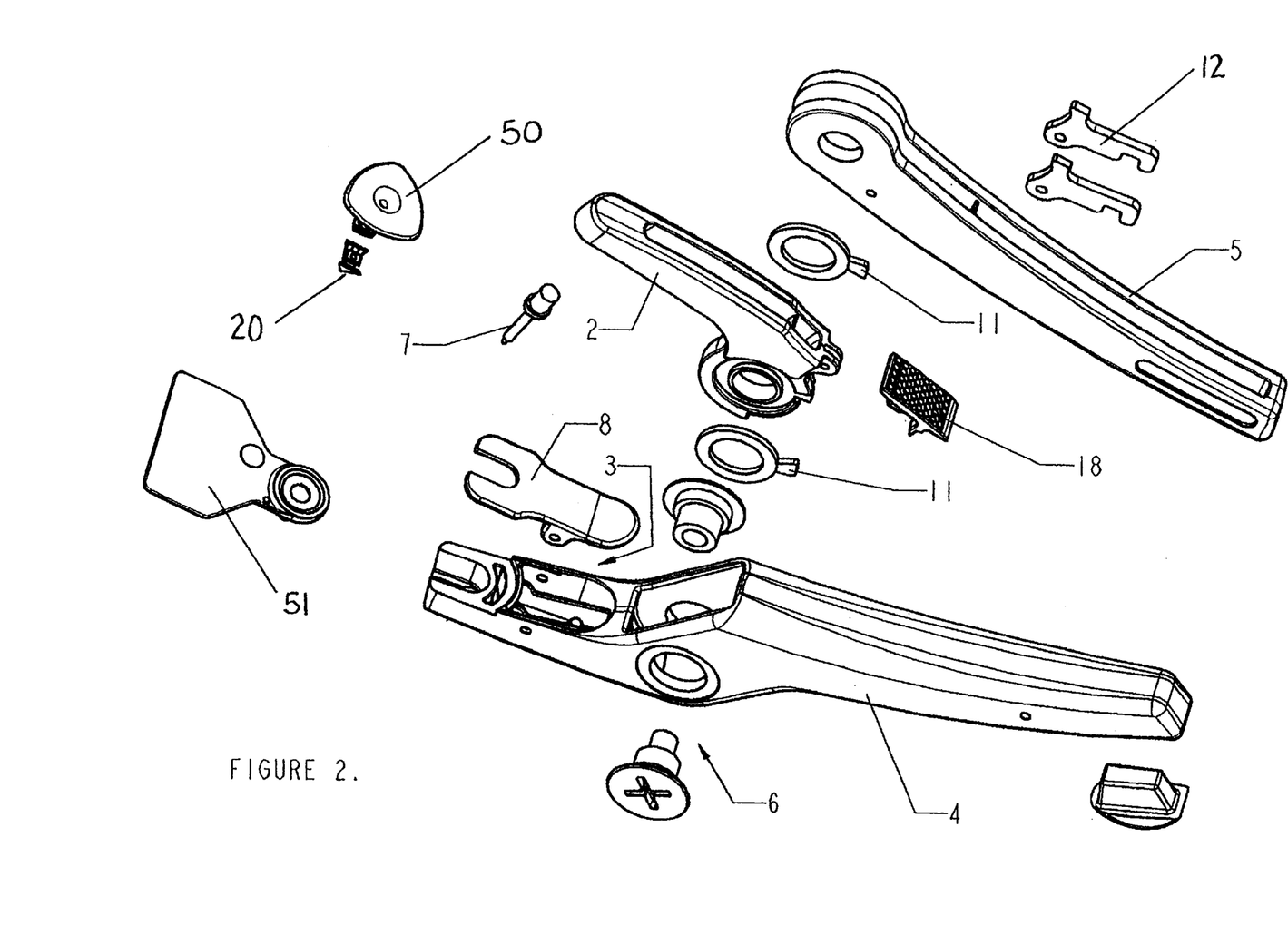
FIG. 2: shows an exploded view of the parts of the apparatus in FIG. 1.
Figure 3:
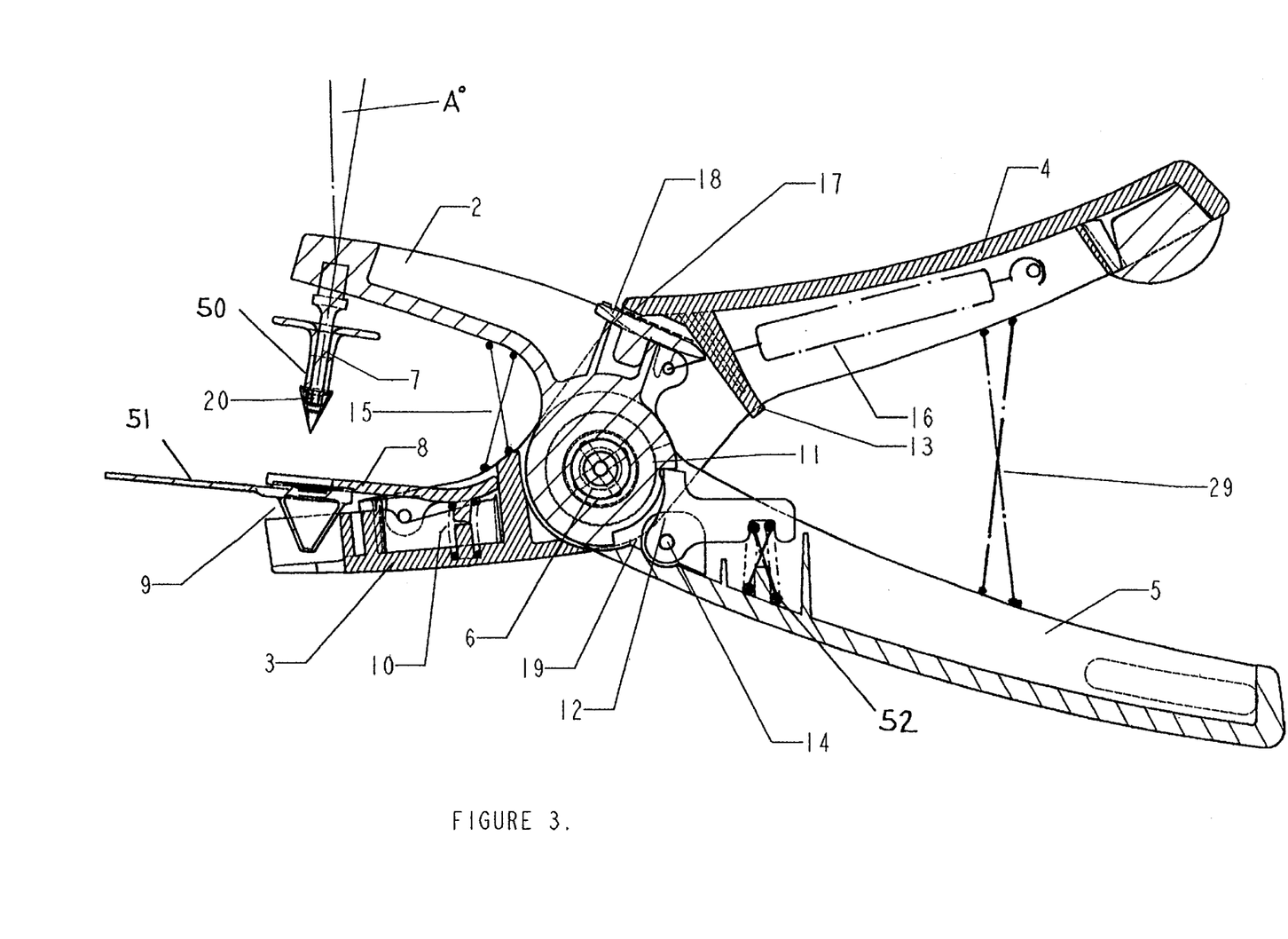
FIG. 3: shows a cross-sectional elevation through the apparatus of FIGS. 1 and 2.
Figure 4:
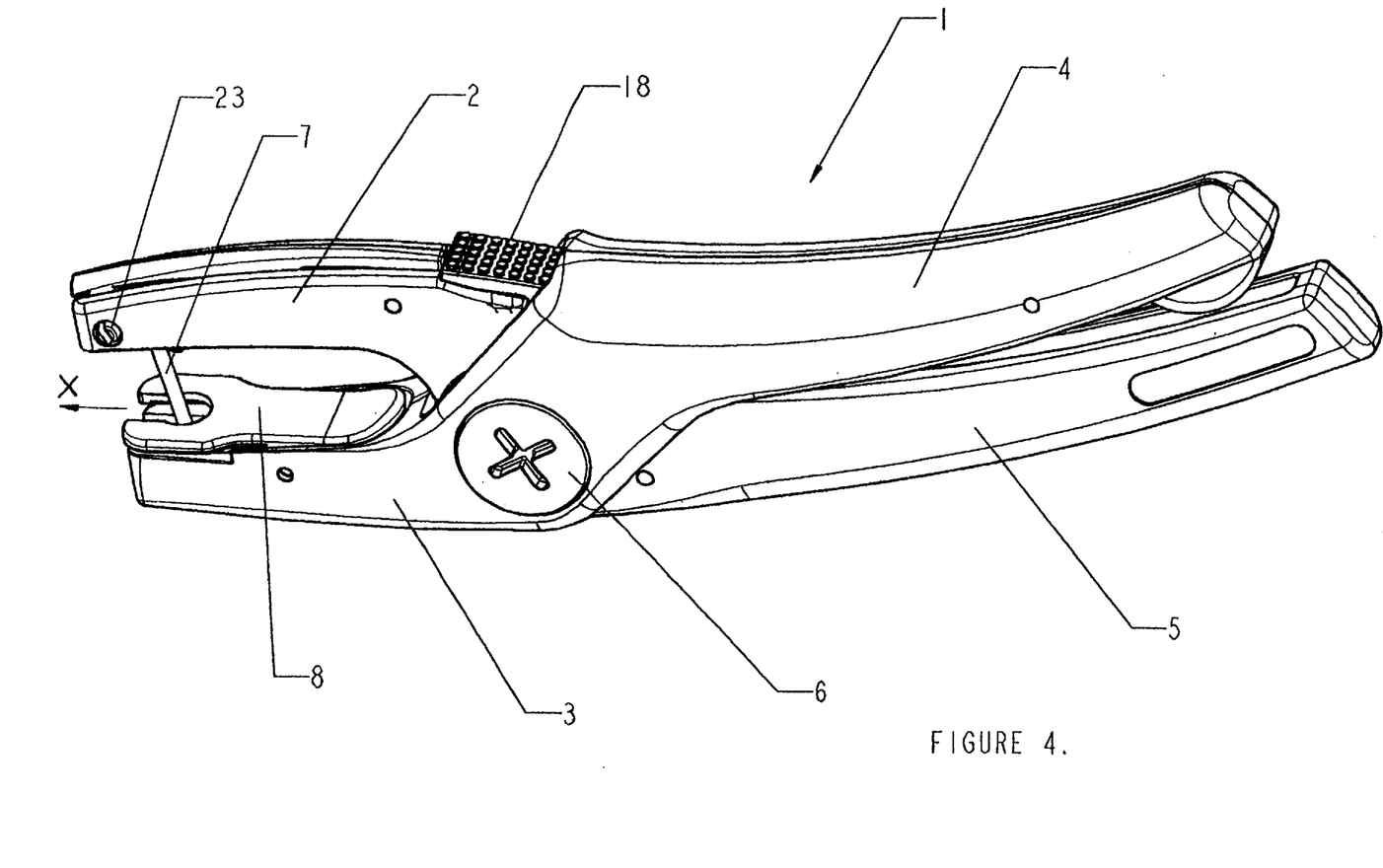
FIG. 4: shows perspective view of a further embodiment of an applicator.

Referring to FIGS. 1 to 3 of drawings, the applicator 1 is shown with a first jaw 2 and a second jaw 3 which may respectively engage first and second or male and female parts 50, 51 of a two piece ear tag or alternatively a single piece tag (not shown). Upon the jaws 2, 3, being moved towards each other, the portions of the ear tag can be engaged on opposed sides of the animal's ear to retain the tag in the animal's ear.

In this particular embodiment, movement of the first and second jaw portions 2, 3 is provided by manipulation of first and second handle portions 4 and 5 respectively. As the handle portions 4 and 5 are drawn towards each other, the jaw portions 2 and 3 are moved towards a closed position in which engagement of the ear tag can take place. In FIG. 1, the jaw portions 2 and 3 are shown in an open position.

Although the handle portions and jaw portions are provided as part of a pliers type arrangement, other configurations are possible. Other forms of handles may be provided with differing actions to drive the first and second jaws towards each other. However, the pliers type arrangement with the handles and jaws acting about a common pivot 6 is preferred for simplicity.

It can be seen that the first jaw portion 2 may be provided with an elongate engagement means 7 suitably in the form of a pin, which is provided to engage within a cavity of a male tag 50 and drive that tag towards the second jaw 3 and the female tag 51 retained by the retention means 8. As shown particularly in the cross section in FIG. 3, retention means 8 may be in the form of a pivoting plate 8 and the female tag 51 may be placed in the cavity 9 underneath the plate 8 to be retained in place. If desired, suitable biasing means such as a spring 10 can be provided to place some pressure on the female tag 51 contained in the cavity 9 and retain the tag 51 in place.

As shown on FIG. 2, although the handle portions 4 and 5 and jaw portions 2 and 3 are provided with a common axis being the pivot axis 6, at least one of the jaw portions 2, is capable of independent movement relative to the handle portions towards the open position. In this particular example, it is the first jaw 2 which is provided as a separate portion to the driving handle portion 5.

Referring to the cross section shown in FIG. 3, it can be seen that the lower jaw 3 is provided integral with the handle portion 4 so that these two provide a static relationship about the pivot axis 6. The upper or first jaw portion 2 is connected to or is integral with a rotating latch 11 acting about the pivot axis 6. It can be seen that as the second handle portion 5 is drawn towards the first handle portion 4, an engagement means 12 pivoted at 14 provided on this second handle portion 5 engages the rotating latch 11 to drive the first jaw 2 towards a closed position. As the handle portion 4 approaches the closed position with the handle portion 5, it can be seen that releasing means 13 which, in this form, is provided as a downwardly projecting portion from the handle portion 4, can engage engagement means 12 and rotate the engagement means 12 about its own pivot axis 14 to a position where the engagement means 12 no longer engages rotating latch 11. The first jaw 2 is then free to rotate about the pivot axis 6 independently of the handle portion 5.

The catch or other engagement means 12 is shown biased by spring 52 into a position engaging with the latch 11. The interrelationship of the projection 13, the latch 11, catch 12 and the movement of the pin 7 with the male tag 50 is such that only after the male tag 50 is fully engaged with the female tag 51 will the jaw 2 be released.

Biasing means are provided to bias the first jaw 2 towards the open position. Biasing means may be provided in a number of alternative forms. Generally, the biasing means may be provided as some form of spring and can comprise such configurations as a compression spring 15 between the first and second jaw portions, a tension spring 16 acting between the first jaw 2 and the handle portion 4 or a circular spring (not shown) acting around the pivot axis 6. The particular form of biasing means can be varied as required. However, a tension spring 16 as shown may be preferred to reduce the complexity of the apparatus around the pivot axis 6 if a spring acting around that pivot 6 were used, and to leave the area between the jaws free as may be more difficult with a compression spring 15 as shown.

Another biasing means such as a compression spring 29 may be used to bias the handles 4, 5 into an open position as a user releases pressure on the handles. Again, the biasing means 29 may be provided in a variety of forms including a variety of springs.

Once the engagement means 12 is disengaged from the rotating latch 11, the first jaw portion 2 is free to rotate to the open position under the influence of the biasing means. In the configuration as shown, the first jaw portion 2 withdraws until contact is made with the bearing surface 17 on an adjacent end of the first handle portion 4. This contact between the first jaw 2 and the bearing surface 17 defines the extent of rotation of the first jaw portion 2 towards the open position. However, to reduce shock in the handle portion 4 as a result of the first jaw portion 2 hitting the bearing surface 17, shock absorbing means 18 may be provided to act between first jaw 2 and the bearing surface 17. The use of some resilient material in this portion may be sufficient to reduce the shock through the apparatus as the apparatus reaches the open position.

In alternative forms, rotation of the rotating latch portion 11 with the first jaw portion 2 can be utilised to stop the first jaw portion 2 hitting the handle portion 4. In such an embodiment, a second bearing surface on the engagement means 12 may be provided such as a further protrusion 19. In this instance, when the handles approach the closed position and the engagement portion 12 is rotated from its initial engagement with the rotating latch 11, the first jaw 2 will rotate until the rotating latch portion 11 bears on the second engaging portion 19. Alternatively a projection on latch 11 to hit or drive the face of catch 12 may be used. This may be preferred in order to remove contact between the first jaw portion 2 and the handle portion 4 entirely.

Also referring to FIG. 3, it can be seen that the elongate engagement means or driving pin 7 may be provided at such a forward facing angle, A°, to the first jaw portion 2 so that, as the jaw portions rotate about the pivot axis 6 towards the closed position, the pin 7 may be substantially perpendicular to the lower jaw 3 when the tip 20 of the pin 7 has travelled almost to the plate 8. This is so that the pin 7 is approximately perpendicular as the tip 20 of the male tag 50 contacts the animal's ear. This is the point at which the greatest strength is required in the pin 7 to commence the piercing of the ear. Further rotation to the fully closed position in which the male tag 50 fully engages the female tag 51 held in cavity 9, rotates the pin 7 past the perpendicular to improve secure engagement of the two portions of the tag. It has been found that with the present geometry, an angle of approximately 18° to 20°, possibly slightly higher or lower, from perpendicular is a suitable angle between the pin 7 and the lower jaw 3 when pin 7 is in the fully closed position. The angle may vary according to the particular arrangement and the orientation about the pivot axis 6.

Referring to FIG. 2, it may be desirable to provide the rotating latch 11 as one or more portions of hardened material such as the two portions shown in FIG. 2 which are themselves provided on the common pivot axis 6. The use of hardened or hard material for the latch 11 may be beneficial particularly if the majority of the apparatus is made from such materials as plastic materials and these may wear in time. An alternative construction may make many of the components from metals and, particularly such a metal as aluminium to reduce weight. Similarly, the engagement means 12 may be provided from a hard material and in two portions as shown in FIG. 2.

In one embodiment spring or biasing means may be used to both open the handles 4, 5 and relocate the catch 12 into a position to again contact latch 11 or these two steps may be performed by separate springs or other biasing means as previously described.

Thus it can be seen that the invention provides an applicator for animal ear tags which allows independent movement of at least one of the jaw portions under the influence of the biasing means once the jaws have reached closed position at which the male and female tags are fully engaged and the ear tag is fully inserted. This reduces the need to open the handle portions 4 and 5 to disengage the applicator from the ear tag. Also, there is no need to provide for the engaging portion 7 itself the ability to release the ear tag while the jaws are still in the closed position.

A further embodiment of the invention is shown in FIGS. 4 to 11, the same reference numbers as used previously being retained where appropriate. In this embodiment, the applicator 1', is provided in much the same manner as the previous embodiment with the first jaw 2 being provided as a retractable jaw which is released from its direct rotational connection to the handles 4, 5 so that it can rotate to the open position independently of the handles 4, 5 under suitable biasing means.

In this embodiment however, the elongate pin 7 is mounted on a mounting block 22 which itself is pivotally mounted by a pivotal connection 23 to the first jaw 2. As can be seen particularly in FIG. 8, this allows the elongate pin 7 to rotate outwardly from the first jaw 2 in the direction of the arrow shown in FIG. 4.

Figure 5:
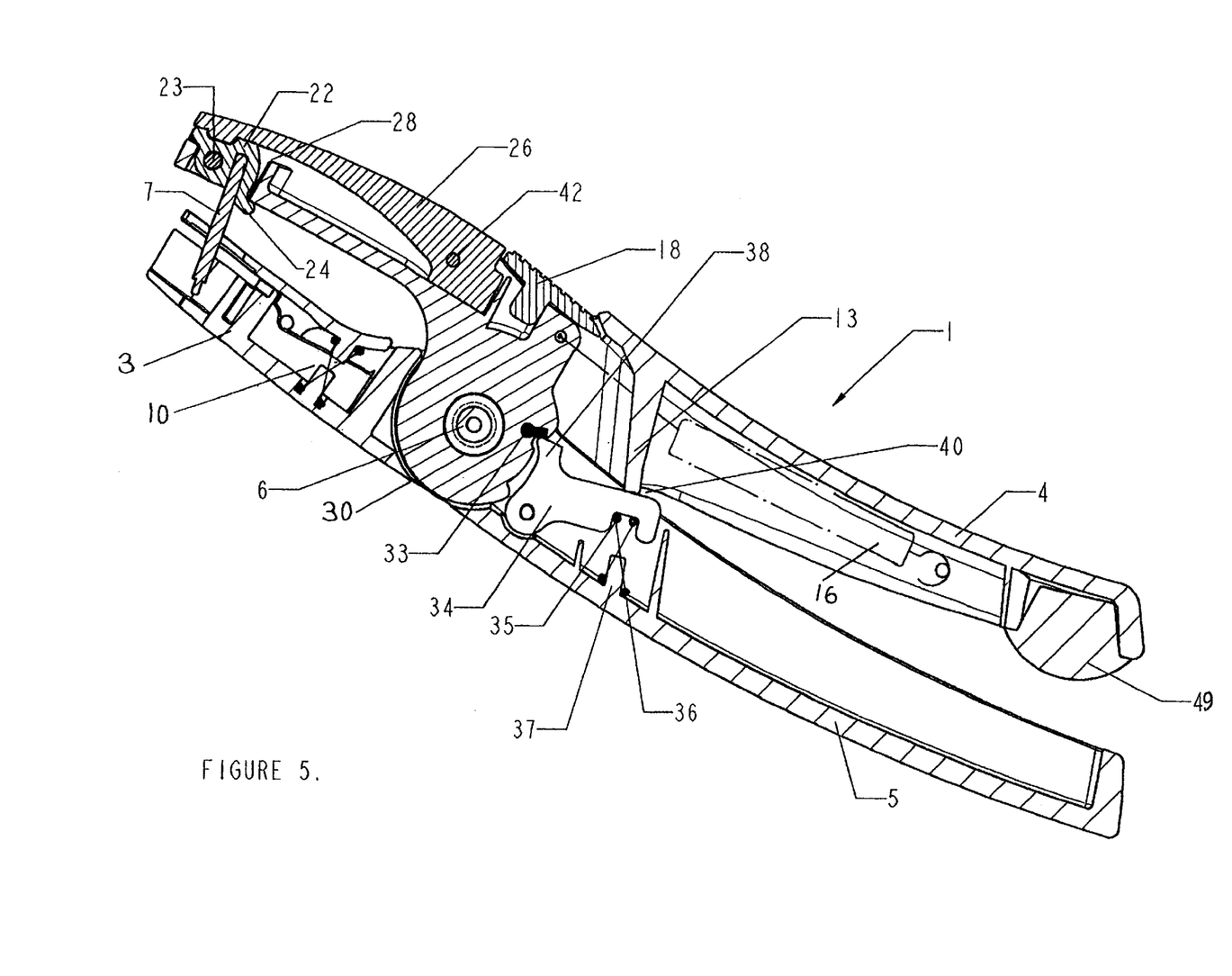
FIG. 5: shows a cross-sectional view through the embodiment of FIG. 4.
Figures 6A, 6B:
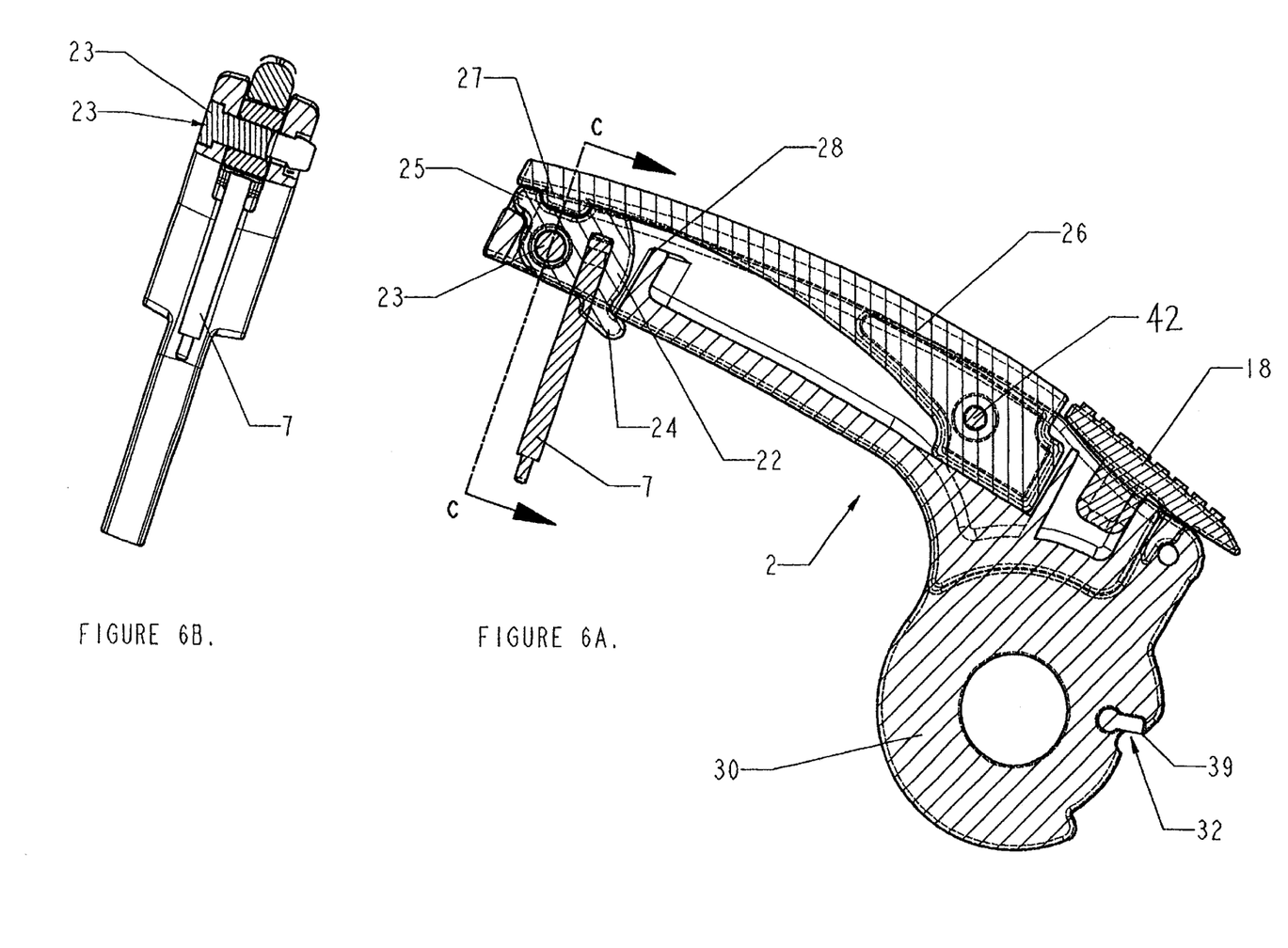
FIGS. 6A & 6B: show respectively side and end cross sectional views of the jaw/pin assembly of FIGS. 4 and 5.
Figure 7:
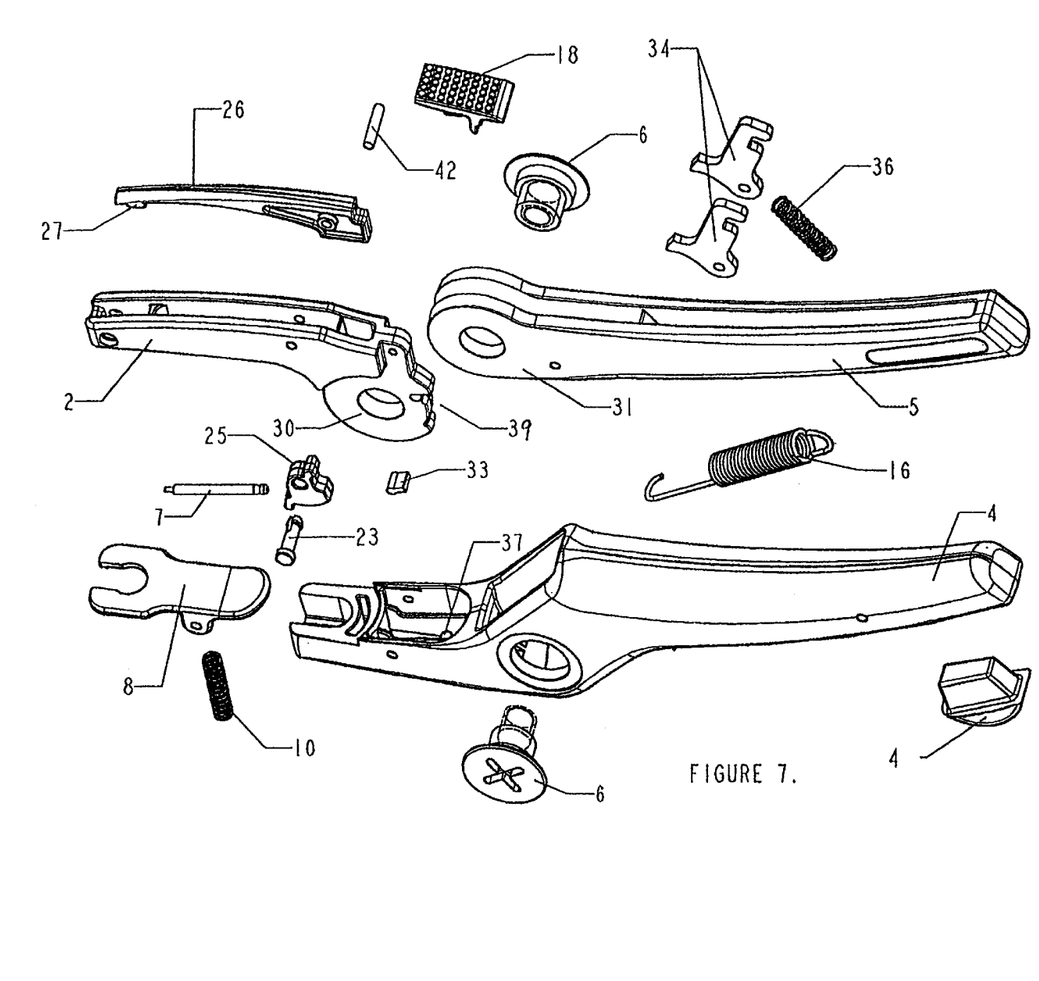
FIG. 7: shows an exploded view of the embodiment of FIGS. 4 to 6.

Referring principally to FIGS. 5, 6 and 7, it can be seen that the mounting block 22 is pivotally mounted so that the longitudinal axis of the elongate pin 7 passes behind the pivot axis 23. In this manner, the longitudinal force along the elongate pin 7 during the tagging process helps to stabilise the elongate pin 7 in its proper position for insertion rather than encouraging It to rotate outwardly. As force is applied to the elongate pin 7, it is supported by the pivot axis 23 and the lip 24 of the mounting block 22. The lip 24 engages against the first jaw 2 so as to prevent counter-rotation of the elongate pin 7 from the position in which it drives the two piece ear tag together.

Figure 8:
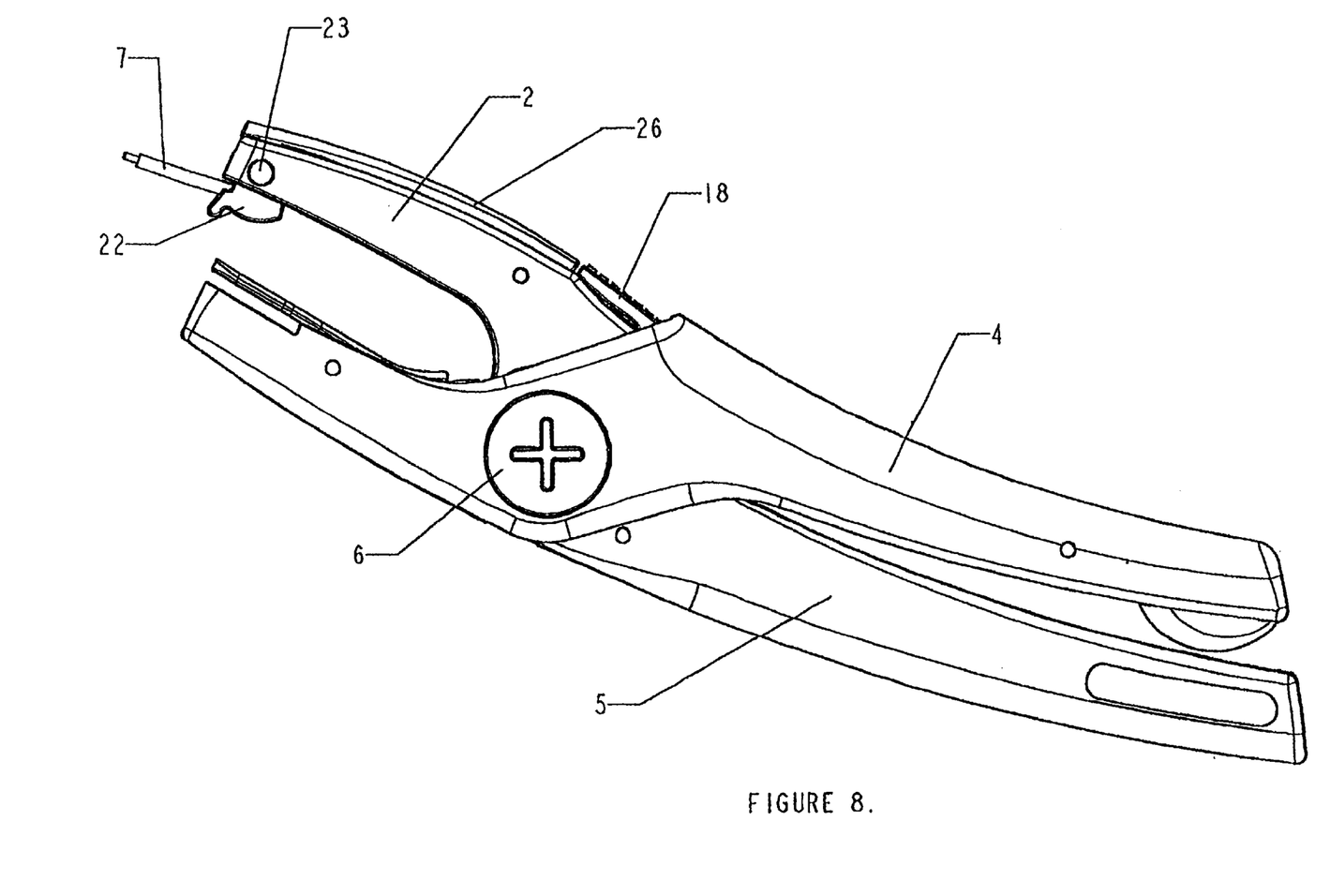
FIG. 8: shows the embodiment of FIGS. 4 to 7 with its pin pivoted outwardly.

It can be seen that the mounting block 22 is provided with a cammed surface 25 which acts against a resilient member 26 to further stabilise the mounting block 22. However, upon application of a lateral force to rotate the elongate engagement means 7 outwardly, the surface 25 can move against the resilient member 26 to allow such outward rotation. The member 26 biases the mounting block 22 into the pin insertion position, however, once overcome and the member 26 lies adjacent alternate surfaces of the mounting block 22, it can bias the mounting block 22 such that the elongate pin 7 is directed outwardly from the first jaw 2 and generally parallel with the overall direction of the first jaw 2, as shown in FIG. 8.

The manner in which the resilient member 26 acts against the cammed surface 25 of the mounting block 22 allows the mounting block 22 to rotate partially toward the outward direction in the direction of the arrow x and still be biased to its stable position as shown in FIG. 5 should that be all the rotation required to free pin 7 from the male tag 50.

In an alternative embodiment rather than being pivotal the mounting for the pin 7, or the pin itself, could be at least partially flexible to again permit a forward rotation flowing of the pin 7 facilitating its release from the male tag 50.

In providing a combination of an independently retractable upper jaw 2 and a pivotally or flexibly mounted elongate pin 7, this preferred embodiment reduces the likelihood of the ear tags 50, 51 jamming in the applicator 1'; causing damage to an animal's ear should it try to move away during the tagging process. The two separate modes of release coact together.

The retractable upper jaw 2 as described in the first embodiment, may still have a tendency to jam should the animal pull away during the tagging process. With a fixed elongate pin 7, the embodiment shown in FIGS. 1 to 3 can have trouble releasing the elongate pin 7 from the male tag 50 as the pin 7 is jammed against the sides of the cavity in the male tag 50 in which it sits.

Figure 9:
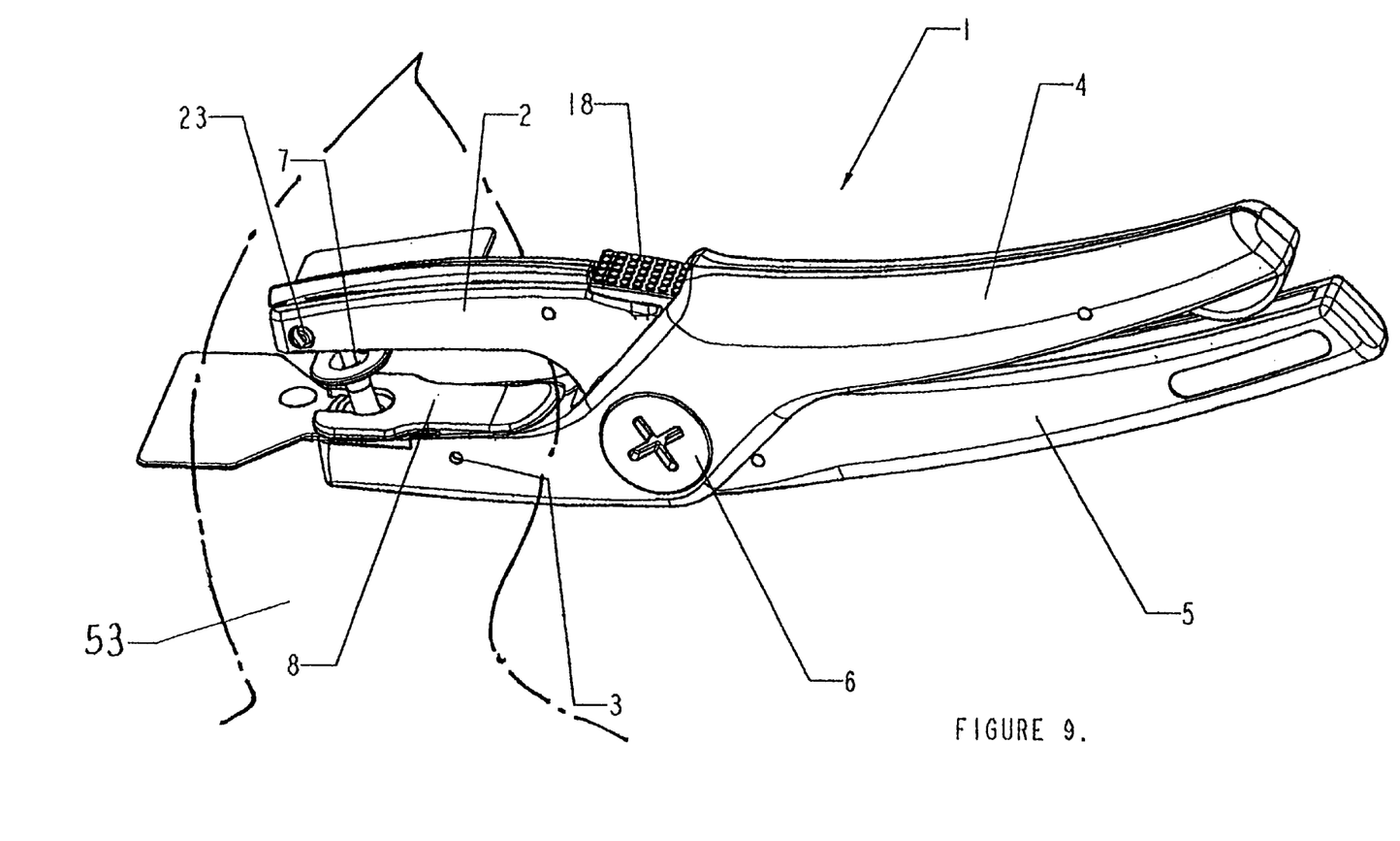
FIG. 9: shows the embodiment of FIGS. 4 to 8 in its jaw-closed position with an ear tag in place.
Figure 10:
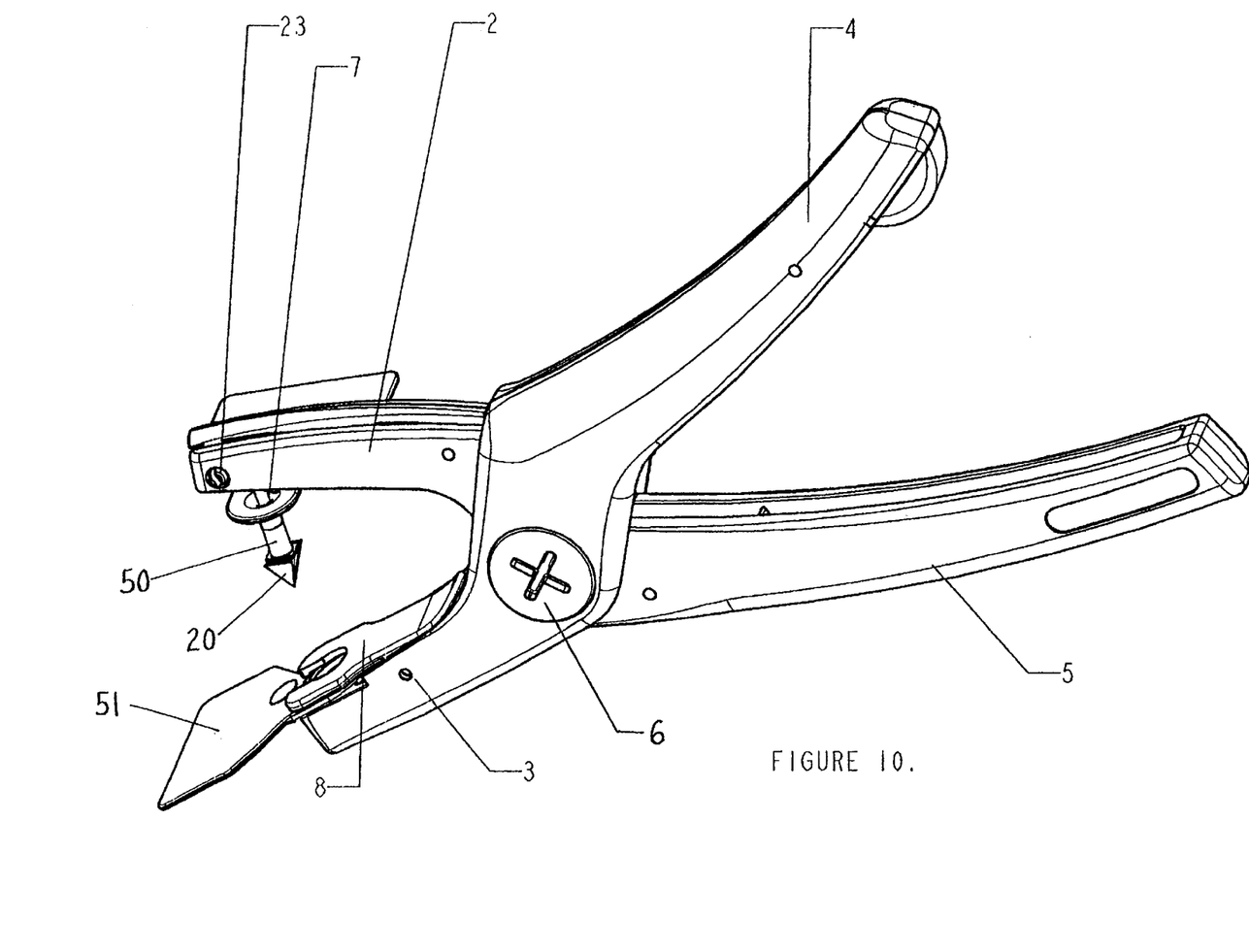
FIG. 10: shows the applicator of FIG. 9 before the jaws have closed.
Figure 11:
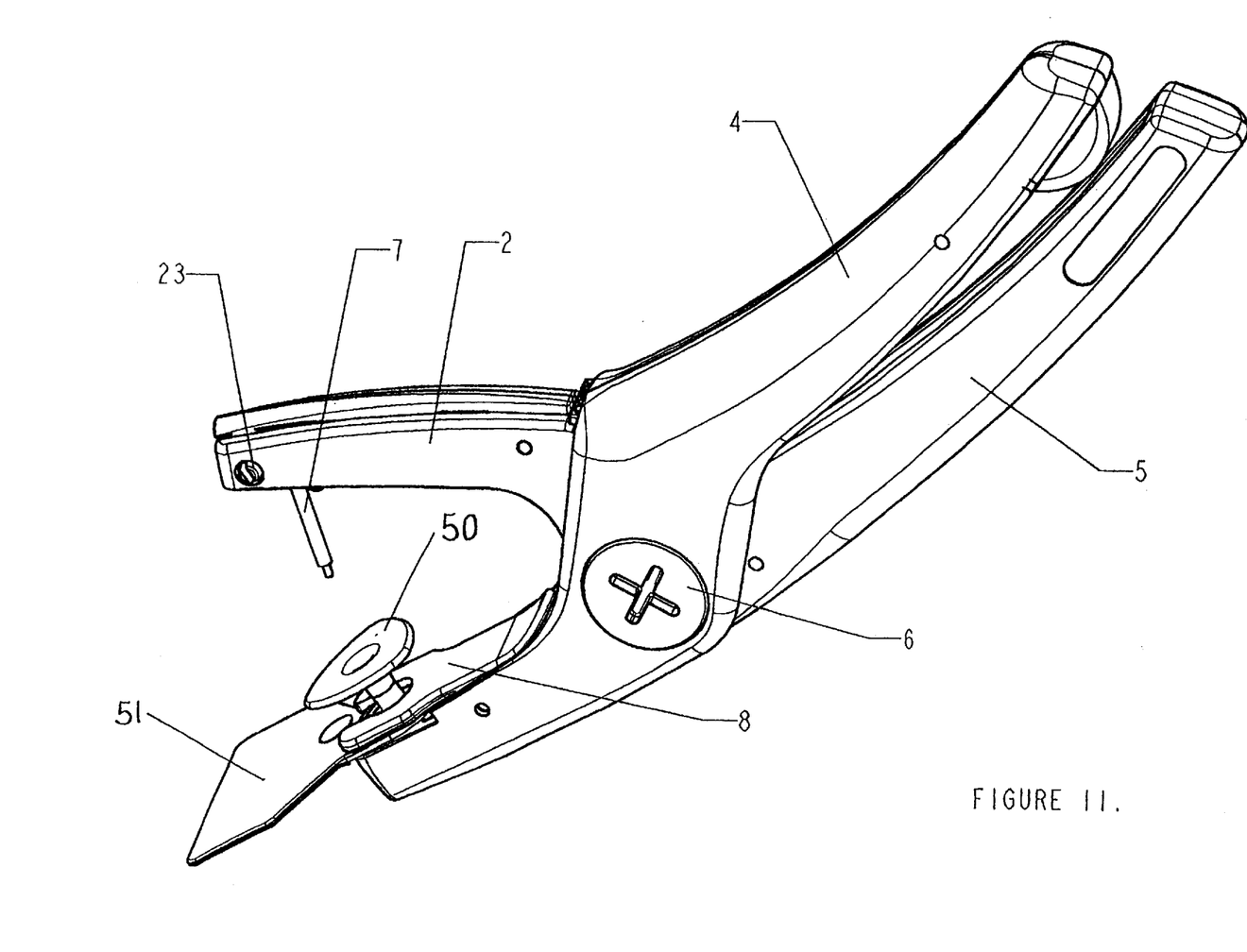
FIG. 11: shows the applicator of FIGS. 9 and 10 after the pin has released from the tag.

In the embodiment of FIGS. 4 to 11 with the independent retraction of the first jaw 2, even minimal movement of the elongate pin 7 in the direction of arrow X limits the force that an animal pulling on the ear tag by moving its ear 53, shown in FIG. 9 in outline, can exert on the pin 7 to jam it in the male tag 50 and inhibit retraction. Full pivotal movement of the pin 7 to a horizontal position may not be necessary to improve the performance; even minimal movement to allow some lateral force to be accommodated may reduce the likelihood of jamming. Although this preferred form refers to pivotal movement of the elongate engagement means 7, as mentioned previously some form of lateral flexibility or movement may be all that is required to limit the force that the ear tag can apply against the pin 7.

Similarly, when considering the outward rotation of the elongate pin 7 about the pivot 23, this may occur simultaneously with some retraction of the first jaw 2 which may accommodate the slight increase in depth the pin 7 reaches within the male tag 50 during the start of the rotation.

Referring particularly to FIG. 7 the latch 11 of FIGS. 1 to 3 has been replaced by an integral latch 30 provided at the pivoting end of the jaw 2. The latch 30 fits between the bifurcated end 31 of the handle 5. The latch 30 includes a recess 39 into which a discrete member 33 of a hard material can be inserted to provide the surface engaged by the tip 38 on the catch 34. The catch 34 is biased into that engagement by a spring 36 mounted between a projection 37 on handle 5 and a recess 35 in the catch 34. In the position shown in FIG. 5, the end of the projection 13 has just engaged the surface 40 of the catch 34 to start its pivoting and its release of the latch 30. At the time of that release the pin 7 will have moved further downwardly from the position shown in FIG. 5 to ensure full engagement of the male tag 50 with the female tag 51.

Referring particularly to FIGS. 6A,. 6B it will be seen that the tip 25 can abut the edge 28 of the jaw 2 when the pin 7 has been moved to its fully horizontal position. Also, while the resistance to the movement of the tip 25 passed the tip 27 of the member 26 may rely on the resilience of the member 26 and its pivoting about pivot pin 42, it is envisaged that a biasing means such as a spring may be used with member 26 which in some embodiments may therefore not itself be resilient.

A resilient stop 49 is shown provided for the end of the handle 4 to provide an abutment against the handle 5.

Therefore, it can be seen that in this further embodiment, not only are two modes of release of the ear tag provided but the different modes assist each other to reduce the risk of jamming in either mode.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

What is claimed is:

1. An ear tag applicator including:
    a first jaw portion to engage a portion of an animal ear tag;

a second jaw portion;

first and second handle portions pivotally connected together to move said first and second jaw portions such that movement of said first handle portion with respect to said second handle portion drives the first and second jaw portions radially towards each other to engage said portion of said ear tag with an animal's ear;

biasing means to bias said jaw portions to an open position; said first jaw portion being caused to move under the action of the biasing means to an open position independently of said handle portions but only after the portion of the ear tag has fully engaged with the animal's ear; said first jaw portion provided with an elongate pin to engage, in use, within a cavity of said portion of said ear tag, a longitudinal axis of the pin being angled forwardly of a longitudinal axis of the first jaw portion, such that with the radial movement of the first jaw portion, the pin is at a substantially 90° angle relative to the second jaw portion as the tag portion engages with the animal's ear, the pin moving beyond said substantially 90° position before the first jaw portion moves to its open position; and wherein the longitudinal axis of the pin passes behind a pivotal axis of the pin.

2. The ear tag applicator of claim 1 wherein said pin is adapted to move outwardly from said first jaw portion in response to a force transverse to said pin.

3. The ear tag applicator of claim 1 wherein said pin is at an angle of between approximately 18° to 20° from the substantially 90° position as the tag portion fully engages with the animal's ear.

4. An ear tag applicator including:

a first jaw portion to engage a portion of an animal ear tag;

a second jaw portion;

first and second handle portions pivotally connected together to move said first and second jaw portions such that movement of said first handle portion with respect to said second handle portion drives the first and second jaw portions radially towards each other to engage said portion of said ear tag with an animal's ear;

biasing means to bias said jaw portions to an open position; said first jaw portion being caused to move under the action of the biasing means to an open position independently of said handle portions but only after the portion of the ear tag has fully engaged with the animal's ear; said first jaw portion provided with an elongate pin to engage, in use, within a cavity of said portion of said ear tag, a longitudinal axis of the pin being angled forwardly of a longitudinal axis of the first jaw portion, such that with the radial movement of the first jaw portion, the pin is at a substantially 90° angle relative to the second jaw portion as the tag portion engages with the animal's ear, the pin moving beyond said substantially 90° position before the first jaw portion moves to its open position; wherein an end of said first handle portion adjacent said first jaw portion is provided with a bearing surface to stop further rotation of said first jaw portion under the action of said biasing means to define the open position of said first jaw portion; and wherein shock absorbing means are provided between said first jaw portion and said first handle portion at or adjacent said bearing surface to inhibit shock forces through said first handle portion when said first jaw portion is rotated to said open portion.

5. An ear tag applicator including:

a first jaw portion to engage a portion of an animal ear tag;

a second jaw portion;

first and second handle portions pivotally connected together to move said first and second jaw portions such that movement of said first handle portion with respect to said second handle portion drives the first and second jaw portions radially towards each other to engage said portion of said ear tag with an animal's ear;

biasing means to bias said jaw portions to an open position; said first jaw portion being caused to move under the action of the biasing means to an open position independently of said handle portions but only after the portion of the ear tag has fully engaged with the animal's ear; said first jaw portion provided with an elongate pin to engage, in use, within a cavity of said portion of said ear tag, a longitudinal axis of the pin being angled forwardly of a longitudinal axis of the first jaw portion, such that with the radial movement of the first jaw portion, the pin is at a substantially 90° angle relative to the second jaw portion as the tag portion engages with the animal's ear, the pin moving beyond said substantially 90° position before the first jaw portion moves to its open position; wherein said first jaw portion is provided with, or is operatively connected with, a latch means, the latch means being disengaged only after the ear tag has been fully engaged with the animal's ear to then enable the first jaw portion to move to its open position independently of the handle portion; wherein a catch means is provided on, or is operatively associated with, said second handle portion, said catch means holding said latch means in its latched position, a catch operating means being provided on, or operatively connected with, said first handle portion so that as the ear tag is becoming fully engaged the catch operating means will engage with said catch means to move said catch means out of engagement with said latch means; and wherein said latch means includes a discrete member of hard material to engage with said catch means.

6. The ear tag applicator of claim 5 wherein said catch operating means includes a projection provided on said first handle portion, an end of which projection being engageable with said catch means.

* * * * *